March 23, 1965 H. K. SCHMIDT ETAL 3,174,811
BALL AND SOCKET BEARING
Filed Feb. 17, 1961 2 Sheets-Sheet 1

INVENTORS.
HEINRICH K. SCHMIDT
JOSEPH ZURICK
BY
THEIR ATTORNEY.

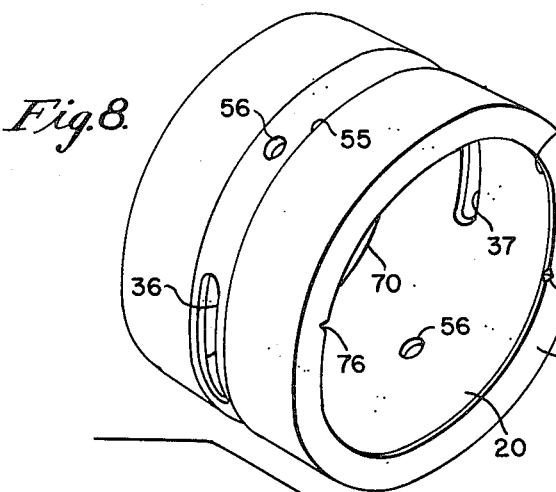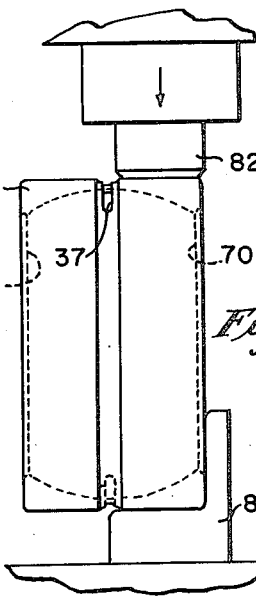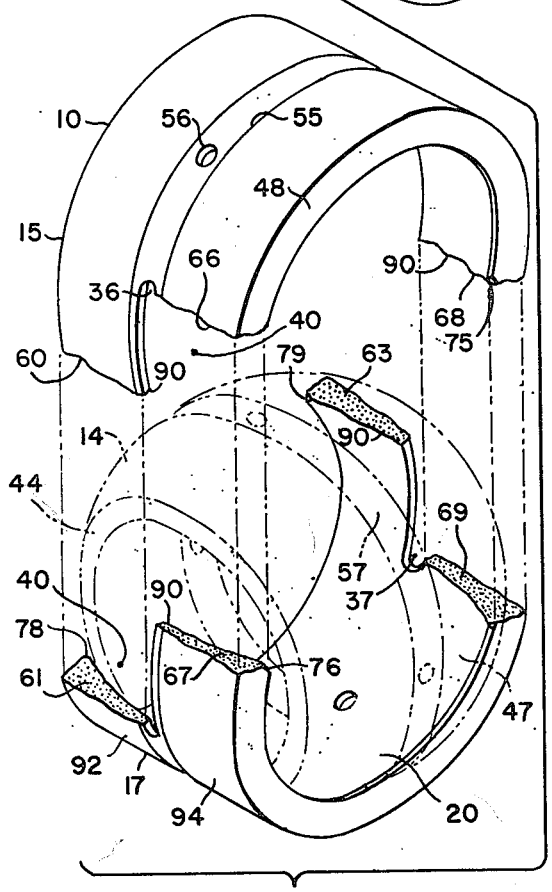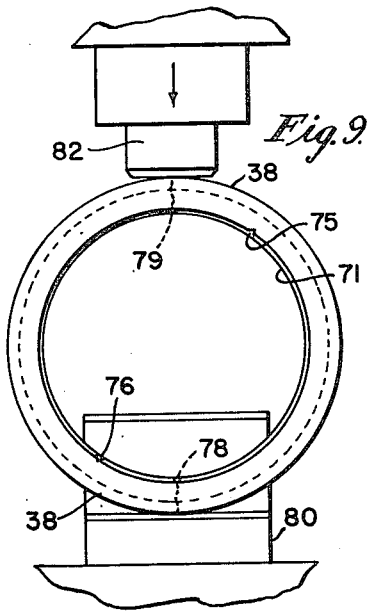

United States Patent Office 3,174,811
Patented Mar. 23, 1965

3,174,811
BALL AND SOCKET BEARING
Heinrich K. Schmidt, Levittown, Pa., and Joseph Zurick, West Trenton, N.J., assignors to Roller Bearing Company of America, Trenton, N.J., a corporation of New Jersey
Filed Feb. 17, 1961, Ser. No. 90,079
5 Claims. (Cl. 308—72)

This invention relates to a self-locking, self-aligning, ball and socket bearing in which the socket is split into two irregular segments.

Self-aligning bearings of the spherical type have heretofore been constructed either with a socket which was cut into two equal parts and held together by a retaining ring or with a two piece socket having a tongue and groove at the ends thereof providing locking engagement with the ball bearing member when the latter was in normal position in the socket. The use of the split ring in connection with two equal halves of a socket was not wholly satisfactory because of the cost of the ring, the cost of the groove in the outer perimeter of the socket in which the ring was seated and the inaccuracy caused by taking a properly machined socket and removing metal therefrom by cutting it to form two equal halves. The tongue and groove socket has involved the use of forged blanks of the general shape of the finished socket and subsequent costly machining operations to form a tongue and groove at the ends of the two halves.

The socket of the present invention is split into two segments at low cost and without loss of metal. Each segment terminates in two end portions each having a reverse L-shape with the radial or circumferential end of the L's extending beyond the midpoints of the circle described by the complete socket and the bottoms of the L's falling short of said mid-points. Prior to segmenting, the inner surface of such socket is machined to match the outer surface of a so-called spherical ball bearing. After segmentation the spherical bearing is placed in one of said segments with its longitudinal axis rotated so that it is 90 degrees away from the longitudinal axis of the socket, and the other segment is placed on top of the ball bearing so as to mate with the lower portion of the socket. If the spherical bearing is then rotated so that its longitudinal axis coincides with the longitudinal axis of the socket, the spherical bearing holds the parts of the socket together so that the whole is a unitary, self-aligning ball and socket bearing.

The primary object of this invention is to provide an exact but relatively inexpensive self-locking ball and socket bearing.

Another object of this invention is to provide a socket divided into two parts without loss of material or permanent change of shape by reason of such division.

Another object of this invention is to divide the socket into two irregularly shaped segments each having a pair of tongues and a pair of recesses so that each part measured circumferentially from tongue end to tongue end will extend substantially more than 180°.

A still further object of this invention is to produce two unique segments which can be readily identified as mating parts and not confused with segments belonging to some other bearing.

The principles of this invention, and the best mode contemplated for carrying out the invention will more fully appear from the following description and accompanying drawings in illustration thereof.

In the drawings:

FIG. 8 is a perspective view of the outer race or socket prior to its division into two parts but after radial slotting;

FIG. 9 is a front elevation view of the outer race or socket and a portion of the punch press utilized to split the socket along four courses;

FIG. 10 is a side elevation view of the outer race and press illustrated in FIG. 9; and FIG. 11 is an exploded perspective view of the inner spherical member in phantom and the two segments of the outer race during assembly or disassembly of the components.

Figure 1:
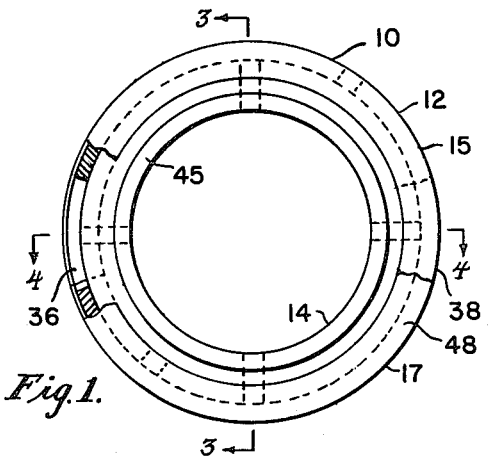
FIG. 1 is a front elevation view, partly in section, of a self-locking, self-aligning bearing embodying the present invention.
Figure 5:
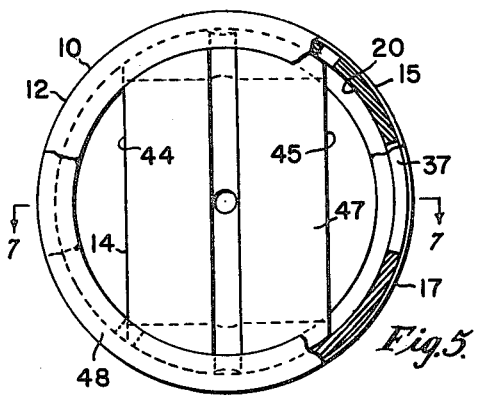
FIG. 5 is a front elevation, partly in section, of the bearing illustrated in FIG. 1, in which the inner component has been rotated 90° relative to the outer annular component preparatory to disassembly of the bearing.

Referring to the drawings, the self-aligning ball and socket bearing 10 comprises an outer annular race or socket 12 surrounding and engaging an inner spherical-like member or ball bearing component 14, the inner spherical surface 20 of the socket 10 being carefully matched with the outer spherical surface 47 of the ball bearing 14.

Figures 2, 3, 6:
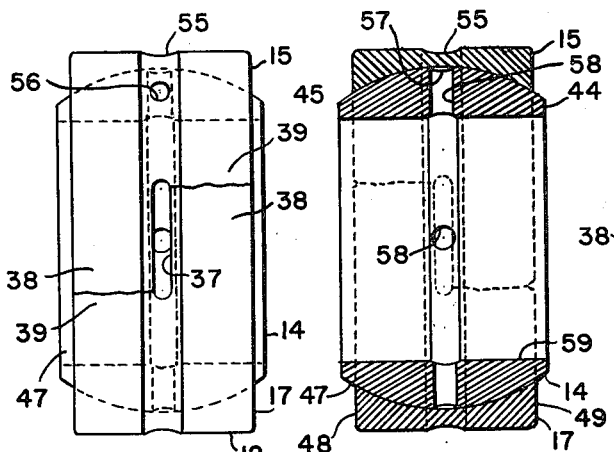
FIG. 2 is a side elevation view of the bearing illustrated in FIG. 1.
FIG. 3 is a vertical sectional view taken through the center of the bearing, along the line 3—3 of FIG. 1.
FIG. 6 is a side elevation view of the bearing as positioned in FIG. 5.
Figure 4:
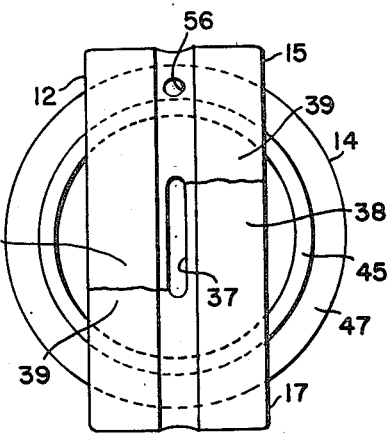
FIG. 4 is a horizontal sectional view taken along the line 4—4 of FIG. 1.

The outer annular socket 12 is formed of two irregular, arcuate segments 15 and 17 each of which may be considered to be formed of two side-by-side semi-circular elements the ends of which are spaced circumferentially to provide locking engagement of the segments when engaging the ball bearing 14 in assembled position, FIGS. 1 and 2. The segments 15 and 17 each terminate in reverse L-shaped ends extending in width less than half the length of the socket 12. Such L-shaped ends each have a curved, radially extending portion 38 and a longitudinal extending portion 39 to define spaces or recesses 40 (FIG. 11) when the segments 15 and 17 are disassembled. When the segments 15 and 17 are assembled the juxtaposed radially extending portions 38 are spaced by radial slots 36 and 37, the ends of which are adjacent to the inner ends of the portions 38 and 39. Such slots 36, 37 may be equal to but are generally slightly longer than the radial portions 38. Said slots 36, 37 are cut through the wall of the socket 180° apart and the widths of the slots preferably straddle the median plane of the socket 12. Each segment 15 and 17, therefore, extends circumferentially substantially more than 180° when measured from the end of the tongue or radial portion 38 to the end of the opposite tongue 38. However, each segment 15 and 17 extends but 180° when measured from the end of one tongue 38 to the longitudinal portion 39 on the same side of said slots.

The inner ball bearing 14 is a one piece bearing having an aperture extending the length of the bearing to receive a shaft or the like (not shown). The ends 44 and 45 of the ball bearing 14 extend beyond the ends 48 and 49 of the socket 12 (FIG. 3) and the outer spherical surface 47 of the ball bearing 14 mates with the inner spherical surface 20 of the socket 12 when the bearing 10 is in normal assembled position.

Lubrication between the socket 12, the ball bearing 14 and a shaft carried by said ball bearing 14 may be provided by groove 55 and associated oil holes 56 in the socket 12 and grooves 57 and 57a and communicating oil holes 58 leading to the inner surface 59 of the ball bearing 14.

To form the socket 12 a relatively soft piece of steel tubing is cut to the desired length and machined to form the illustrated inner and outer surfaces. Radial slots 36, 37 are then cut completely through the wall of the socket 12, preferably within the confines of the groove 55. The edges 71 and 70, formed by the intersection of the ends 48 and 49 and inner surface 20, are punched or ground to form notches 75, 76, 78 and 79 (FIGS. 8 and 9). Notches 75 and 76 are diametrically opposed 180° apart in edge 71 and in line with one end of the slot 36 and the opposite end of slot 37. Similar notches 78 and 79 are formed in edge 70 but in line with the reverse ends of slots 36 and 37.

To split the socket 12 into two slightly irregular arcuate segments 15 and 17 the steel is first hardened by any suitable means. After hardening approximately half of the socket 12 is placed on an anvil 80 of a punch press with the notches 75, 76 or 78, 79 vertically aligned. The supported portion of the socket 12 is then struck a sharp blow with the punch 82 which splits the socket longitudinally (FIG. 9) from the notch 78 to the slot 36, thereby forming irregular mating surfaces 60 and 61, and at the same time, splits the socket on the opposed side from the notch 79 to the slot 37, to form irregular mating surfaces 62 and 63. The socket 12 is then removed from the anvil 80, reversed and reinserted with the remaining notches vertically aligned. A second sharp blow splits the socket 12 longitudinally from the notch 76 to the slot 36 and from the notch 75 to the slot 37 forming irregular mating surfaces 66, 67 and 68, 69 respectively. When the second splitting action occurs, the socket 12 is completely divided into the two arcuate segments 15 and 17. Because of the irregularity of the mating surfaces the arcuate segments 15 and 17 can only be joined properly when surface 60 contacts surface 61, surface 62 contacts surface 63, etc. If the segments 15 and 17 are reversed relatively to each other so that surface 68 engages surface 61, surface 66 engages surface 63, etc., the segments 15 and 17 will be slightly spaced from each other and will no longer present a continuous, spherical surface 20 to the ball bearing 14 and such ball bearing 14 will not fit in the socket 12 or perform its locking function.

Figure 7:
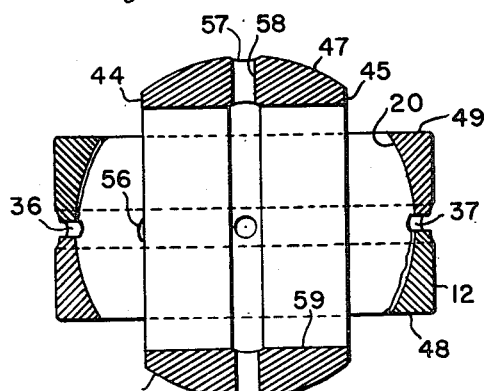
FIG. 7 is a horizontal sectional view taken along the line 7—7 of FIG. 5.

To assemble the ball and socket bearing 10 from the various parts, the inner ball-like bearing 14 is positioned in one of the arcuate segments, say, 17, upon the concave surface 20. The ball-like bearing 14 is placed (FIGS. 7 and 11) so that the central (median) plane (transverse to the longitudinal axis) is perpendicular to the central (median) plane of the arcuate segment 17. The segment 15 (positioned with its central plane perpendicular to the central plane of the ball bearing and parallel to the central plane of the segment 17, FIG. 11) is then placed into engagement with the segment 17 so that the segments 15 and 17 will bear the same relationship to each other as they did before the socket 12 was split. Thereupon the ball bearing 14 is turned 90° so as to bring its central plane into substantial coincidence with the central plane of the socket 12. With such turning of the ball bearing 14 the ball and socket bearing 10 becomes locked into a unitary structure with the ball bearing 14 free to rotate relatively to the socket 12. By reversing the aforementioned order of assembly, the bearing 10 may be easily disassembled provided the ball bearing 14 is turned so that edges 90 formed by the intersection of the surface 20 with the surfaces 60, 63, 67 and 68, do not overlap the spherical surface 47 of the ball bearing 14.

The spherically convexed surface 47 of the ball bearing 14 together with the curved, radially extending end portions 38 act as a key to lock together the arcute segments 15 and 17. The protuberances 38 of the two segments 15 and 17 at the two abutting zones, provide side-by-side locking protuberances extending across the circumferential semi-circular extent of the segment 15 or 17 and hold the parts together against accidental disassembly during normal movement of the ball-like bearing 14, when in use.

Each arcuate segment 15 or 17 may be considered as comprising two side-by-side approximately semi-circular acuate elements 92 and 94, FIG. 11. The right-hand semi-circular element 94 is rotated clockwise (relative to the element 92) through an arc of 35°–40°. Such relative rotation of the elements 92 and 94 forms the protuberances 38.

Having described our invention, we claim:

1. A self-aligning, self-locking ball and socket bearing comprising an outer socket including a pair of arcuate segments, said arcuate segments having mating end portions, said socket having a central, spherically-curved, internally-concave surface, and an inner ball member positioned in said socket and having an outer, spherically-curved externally convex surface mating with the spherically-concave surface of said socket, said mating end portions including protrusions extending circumferentially in excess of a semi-circle at each end in side-by-side relation with each other, said ball member having cutaway opposite sides so that rotation of said ball member into a position with its median plane approximately perpendicular to the median plane of said outer annular bearing unit allows the ball to be disassembled from the outer annular bearing, but substantial coincidence of said planes locks the ball within the outer annular bearing, said mating end portions having abutting irregular non-uniform surfaces disposed on opposite sides of said median plane and on opposite sides of the circumferential extent of said arcuate segments forming non-interchangeable segments.

2. A self-aligning, self-locking ball and socket bearing comprising an outer socket including a pair of arcuate segments annularly arranged, said arcuate segments together defining two pairs of mating end portions, said socket having a central, spherically-curved, internally-concave surface, and an inner ball-like member positioned in said socket and having an outer spherically-curved, externally convex surface mating with the spherically-concave surface of said socket, each of said arcuate segments having portions on opposite sides of the medial plane extending circumferentially in excess of a semi-circle, said ball-like member having cutaway opposite sides so that rotation of said ball-like member into a position with its median plane approximately perpendicular to the median plane of said socket allows the ball-like member to be removed from said socket, but near coincidence of said planes locks the ball-like member within said socket, each of said pairs of mating end portions having two pairs of abutting irregular non-uniform surfaces disposed on opposite sides of said median plane and on opposite sides of the circumferential extent of said arcuate segments forming non-interchangeable segments.

3. The structure recited in claim 2 wherein each of the end portions of the arcuate segments are in the form of reverse L-shaped protrusions, each mating pair of end portions having the generally vertical portions of the L-shapes disposed on opposite sides of the median plane and the generally horizontal portions of the L-shapes disposed on circumferentially opposite sides of the semi-circular extent of said arcuate segments, the horizontal surfaces of the L-shapes of one arcuate segment abutting the end surfaces of the vertical shapes of the L-shaped protrusions formed on the other arcuate segment.

4. A self-aligning, self-locking ball and socket bearing including an outer socket having a central plane and opposite sides disposed substantially parallel thereto, said socket comprising a pair of mating arcuate segments disposed annularly and having adjacent ends mating with one another, said outer bearing having a central, spherically-curved, internally concave annular surface, and an inner ball-like member positioned in said socket and having a spherically-curved, convex outer surface mating with the spherically-concave surface of said outer bearing, said ball-like member having a central plane passing through its center of curvature and cutaway opposite sides parallel to said central plane so that rotation of said ball-like member into a position with its central plane approximately perpendicular to the central plane of said socket allows the components to be disassembled, the components being locked in assembled position when said central planes are rotated substantially into coincidence with one another, each arcuate segment having circumferentially-elongated protrusions, disposed at opposite ends, on opposite sides of the median plane, and extending circumferentially in excess of the semi-circular extent of said segments, each protrusion terminating in an irregular end surface, each arcuate segment having a receiving irregular surface at each of its ends, alongside each protrusion, and on opposite sides of the median plane for mating with one of the end surfaces of the protrusions formed on the other arcuate segment and not the other of the end surfaces on the last mentioned arcuate segment so that the protrusions of the segment ends are in side-by-side relation when the segments are assembled, the protrusions of one segment being spaced by radial openings from the protrusions of the other segment with which they are in side-by-side relationship, and the receiving surface and the end surface on the same side of the central plane being diametrically aligned in each arcuate segment.

5. A self-locking ball and socket bearing comprising a socket having an inner spherically and internally curved surface and a central transverse plane, said socket comprising two substantially equal arcuate segments having a tongue and a recess on each end of said segments, each tongue terminating in a generally radial surface having irregularities, each recess being defined in part by a generally radial bottom surface having irregularities which only properly mate with the irregularities on the terminal surface of the tongue with which it is associated for jointly and properly forming said inner spherically and internally curved surface, the tongue and recess on each end of said segments being on opposite sides of the central transverse plane of said socket, a pair of diametrically opposed radial elongated slots in said socket straddling said central transverse plane and spacing adjacent tongues when said bearing is in assembled position, and a ball-like member seated in said socket and having a spherically curved outer surface normally mating with the said inner surface of said socket, said ball-like member being separable from said socket by positioning said socket and ball-like member so that said tongues do not engage the outer surface of said ball-like member, each tongue extending beyond the mid-point of the circle described by the inner surface of said socket and each recess falling short of the associated mid-point.

References Cited by the Examiner

UNITED STATES PATENTS

| | | | |
|---|---|---|---|
| 2,681,259 | 6/54 | White | 308—72 |
| 2,787,048 | 4/57 | Heim | 29—149.5 |
| 2,895,769 | 7/59 | Dwyer | 308—72 |
| 2,932,580 | 2/60 | Dwyer | 308—72 |
| 2,952,901 | 9/60 | King | 29—149.5 |

FOREIGN PATENTS 278,687    2/52    Switzerland.

FRANK SUSKO, *Primary Examiner.*

RICHARD A. DOUGLAS, ROBERT C. RIORDON,
*Examiners.*